O. J. ROTH.
ICE CREAM CONE HOLDER.
APPLICATION FILED JULY 23, 1919.
1,338,192. Patented Apr. 27, 1920.
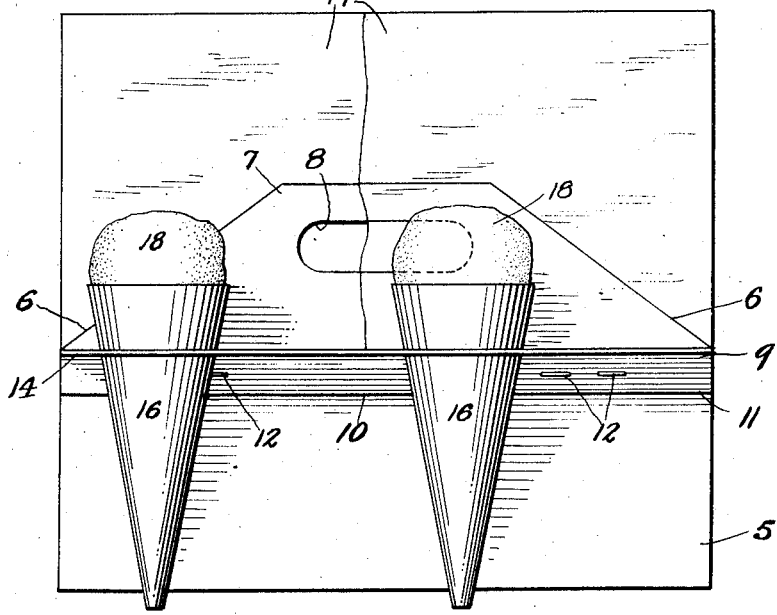
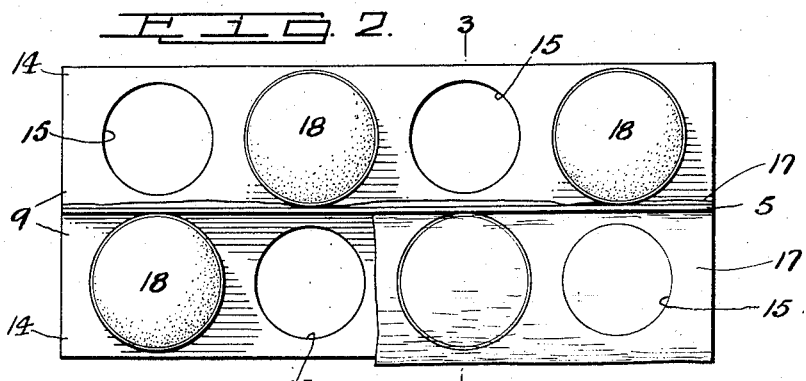
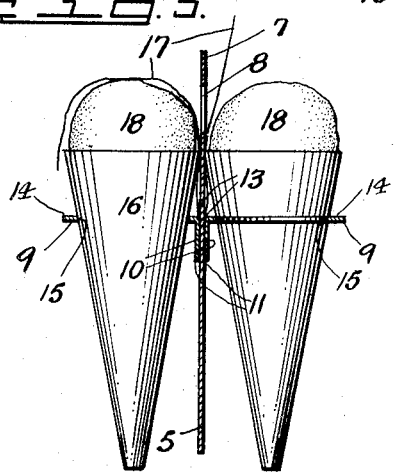
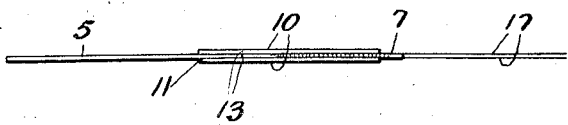
Inventor
Otto J. Roth
By his Attorney

UNITED STATES PATENT OFFICE.

OTTO J. ROTH, OF RICHMOND HILL, NEW YORK.

ICE-CREAM-CONE HOLDER.

1,338,192. Specification of Letters Patent. Patented Apr. 27, 1920.

Application filed July 23, 1919. Serial No. 312,714.

*To all whom it may concern:*

Be it known that I, OTTO J. ROTH, a citizen of the United States, and residing at Richmond Hill, L. I., in the county of Queens and State of New York, have invented certain new and useful Improvements in Ice-Cream-Cone Holders, of which the following is a specification, such as will enable those skilled in the art to which it appertains to make and use the same.

This invention relates to ice cream cone holders, and the object of the invention is to provide a device of this class which is designed to be used as means for conveniently carrying a plurality of ice cream cones in an upright position and without upsetting said cones or breaking the same, or spilling the contents thereof; a further object being to provide means for covering or inclosing the contents of the cones to prevent dust or dirt coming in contact therewith; and a still further object being to provide a device of this class which may be compactly folded together when not in use to permit of the storage or shipment of large quantities thereof in comparatively small packages; and with these and other objects in view the invention consists in an article of the class and for the purpose specified which is simple in construction and operation and efficient in use.

The invention is fully disclosed in the following specification, of which the accompanying drawing forms a part, in which the separate parts of my improvement are designated by suitable reference characters in each of the views, and in which:—

Figure 1 is a side view of the device and indicating the method of its use;

Fig. 2 a plan view of the device as shown in Fig. 1 with a part in a different position and with part of the construction broken away;

Fig. 3 a section on the line 3—3 of Fig. 2; and,

Fig. 4 a side edge view of the holder in its compactly folded position.

My improved cone holder consists of a central body portion 5, the opposite end edge portions of which are cut out as shown at 6, adjacent to the upper edge thereof, to form a hand-piece 7, and said body portion is, provided with an elongated aperture 8 through which a finger or fingers of the hand may be passed in grasping and carrying the holder. Secured to the opposite sides of the central body portion approximately centrally thereof are oppositely arranged cone supporting members 9 formed from strips 10 also preferably of cardboard, one edge portion of which is secured to the opposite side faces of the central body portion as shown at 11, and preferably by staples 12 as indicated in Fig. 1.

The strips 10 are scored as indicated at 13 to permit of the folding of the free portions 14 of said strips into the position shown in Figs. 1, 2 and 3, as well as that shown in Fig. 4. The free portions 14 of the strips 10 are also provided with a plurality of apertures 15 which when said free portions 14 are extended as shown in Figs. 1, 2 and 3 are adapted to receive ice cream cones 16 which are passed downwardly therethrough as clearly illustrated in said figures.

Secured between the central body portion 5 and the strips 10 and at the opposite sides of said central body portion are sheets or strips 17 of waxed, tissue, or similar paper which are cut to approximately the same longitudinal dimensions as the central body portion 5 and the strips 10 as clearly shown in Fig. 1, and the width of which is such as to permit of their being folded over the ice cream 18 in the cones 16, so as to entirely cover said cones and to prevent dust, or dirt from coming in contact therewith, or the cream, therein. In other words, the sheets 17 of paper serve as a wrapping medium, while the cone holders 9 with the central body portion 5 serve to support the cones 16 in a vertical or upright position; and in such manner as to prevent the detachment thereof from the holder and to prevent the breaking up of the cones or the spilling of the ice cream therein.

It will be understood that my invention is not limited to any specific size of holder or to the number of apertures 15 therein, and while I prefer to construct the device of heavy cardboard, my invention is also not limited to the material employed as the same may be made out of any kind or class of material, and various changes in and modifications of the construction herein shown and described may be made, within the scope of the appended claim, without departing from the spirit of my invention or sacrificing its advantages.

Having fully described my invention, what I claim as new and desire to secure by Letters Patent, is:—

A device of the class described comprising a central body portion, strips secured to the opposite sides of said body portion and provided with foldable parts which are adapted to extend at right angles thereto and are provided with means for supporting a plurality of ice cream cones, and flexible sheets secured to the central body portion and adapted to be passed outwardly and over the top portions of the cones when so supported.

In testimony that I claim the foregoing as my invention I have signed my name in presence of the subscribing witnesses this 21st day of July 1919.

OTTO J. ROTH.

Witnesses:
C. E. MULREANY,
H. E. THOMPSON.